United States Patent [19]

Yamamoto et al.

[11] Patent Number: 5,494,512
[45] Date of Patent: Feb. 27, 1996

[54] ALUMINUM PIGMENTS

[75] Inventors: Takashi Yamamoto, Setagaya; Masatoshi Uenishi, Fujiidera; Haruzo Katoh, Akashi; Shunichi Setoguchi, Kashihara, all of Japan

[73] Assignee: Toyo Aluminium Kabushiki Kaisha, Osaka, Japan

[21] Appl. No.: 266,754

[22] Filed: Jun. 28, 1994

[30] Foreign Application Priority Data

Jul. 5, 1993 [JP] Japan ................................. 5-165648
Jun. 24, 1994 [JP] Japan ................................. 6-142819

[51] Int. Cl.$^6$ ................................. C09C 1/62
[52] U.S. Cl. ................. 106/404; 106/403; 106/479; 106/23 C; 106/27 B; 106/31 A; 106/14.21; 106/14.25; 106/14.33; 106/14.39; 106/14.44
[58] Field of Search ................. 106/404, 479, 106/403, 23 C, 27 B, 31 A, 14.21, 14.25, 14.33, 14.39, 14.44

[56] References Cited

U.S. PATENT DOCUMENTS

| | | | |
|---|---|---|---|
| 3,969,127 | 7/1976 | Robitaille et al. | 106/425 |
| 4,350,535 | 9/1982 | Ishijima et al. | 106/403 |
| 5,028,639 | 7/1991 | Treutlein et al. | 523/200 |

FOREIGN PATENT DOCUMENTS

| | | |
|---|---|---|
| 0104075 | 3/1984 | European Pat. Off. . |
| 0133644 | 3/1985 | European Pat. Off. . |
| 0206140 | 12/1986 | European Pat. Off. . |
| 0583919 | 2/1994 | European Pat. Off. . |
| 2053258 | 2/1981 | United Kingdom . |

OTHER PUBLICATIONS

Database WPI Section Ch. Week 9252, Derwent Publications Ltd. London, GB, Class G01 AN 92–426415 & JP–A–4 318 181 (Nippon Paint Co.) 9 Nov. 1992 Abstract.
Database WPI, Section Ch. Week 8513, Derwen Publications Ltd., London, GB, Class G01, AN 85–077465 & JP–A–60 029 401 (Pentel K.K.) 14 Feb. 1985 Abstract.
*Derwent Publications Ltd.,* London, GB; 92–426415, (Nippon Paint) 9 Nov. 1992 (abstract).
*Derwent Publications Ltd.,* London, GB; 82–077465 (Pentel) 14 Feb. 1985 (abstract).

*Primary Examiner*—Mark L. Bell
*Assistant Examiner*—Scott L. Hertzog
*Attorney, Agent, or Firm*—Nixon & Vanderhye

[57] ABSTRACT

Disclosed herein is an aluminium pigment comprising aluminium flakes, the surface of each aluminium flake being coated with a film of molybdic acid in an amount of 0.1 to 10% by weight in terms of Mo based on aluminium, which is further coated with a phosphoric film derived from a phosphoric compound selected from inorganic phosphoric acids, organic phosphoric acid esters having one phosphate group and their salts in an amount of 0.05 to 1% by weight in terms of P based on aluminium. The aluminium pigment of the present invention has good color tone and good adhesion. Further, the aluminium pigment of the present invention has good resistance to hot water.

6 Claims, No Drawings

ALUMINUM PIGMENTS

FIELD OF THE INVENTION

The present invention relates to aluminium pigments which are incorporated into water based paints used for finish coating car bodies and the like as well as water based inks.

PRIOR ART

The aluminium pigments to be incorporated in the water based paints and the water based inks are described in many prior publications.

JP-B-59009729 describes a treatment of aluminium flakes with an aqueous solution containing phosphoric acid or its salt so as to obtain the aluminium pigment. By this treatment, an aluminium pigment which inhibits the production of hydrogen gas by the reaction of the aluminium flakes with water can be obtained. This treatment has important defects in that the resultant coating has a poor color tone and the color tone of the coating is spoiled when the coating is dipped in hot water. JP-B-85008057 describes the treatment of the aluminium flakes with a phosphate ester having $C_6$ or more alkyl group(s) to obtain the aluminium pigment. By this treatment, an aluminium pigment which inhibits the production of hydrogen gas and has good color tone can be obtained. This treatment has an important defect in that the aluminium pigment shows a very poor adhesion with any resin contained in the water based paint.

The treatment of aluminium flakes with acid phosphate esters modified with organic functional groups so as to obtain the aluminium pigments is also described in many prior publications. For example, JP-B-85015466 describes treatment of aluminium flakes with the phosphate ester modified with an aromatic ring-containing functional group and an amino group, but this treatment cannot give the satisfactory improvement in the adhesion of the aluminium pigment to the resin. JP-B-90015590 describes treatment of aluminium flakes with a phosphate ester having a terminal carboxyl group, but the inhibition of the production of hydrogen gas and the improvement in the adhesion of the aluminium pigment are insufficient by this treatment.

JP-B-89054386 describes the treatment of aluminium flakes with chromic acid to obtain the aluminium pigment. By this treatment, the aluminium pigment has a good stability in the water base paint, can inhibit the production of hydrogen gas and which is excellent in color tone. Although, the adhesion of the aluminium pigment with the resin can be improved, if the aluminium pigment comprises fine aluminium flakes, however, this treatment causes the dissolution of the fine aluminium flakes due to the high reactivity of chromic acid. Thus, the aluminium pigment comprising the fine aluminium flakes having an average particle size ($D_{50}$) of less than 20 μm is not obtained. Further, this treatment causes industrial hygienic and environmental problems due to the use of Cr(VI) and therefore, its application is limited.

As described above, there is no prior art which can provide an aluminium pigment suitable for the incorporation in the water base paint used for finish coating the car body, which is excellent in color tone, stability in water based paint and coating properties.

An object of the present invention is to provide an aluminium pigment suitable for incorporation in the water based paint used for finish coating the car body, which is excellent in the stability in water based paint, color tone of the coating and adhesion to the resin in the water based paint.

SUMMARY OF THE INVENTION

The present invention provides an aluminium pigment suitable for incorporation in a water based paint, comprising aluminium flakes, the surface of each aluminium flake being coated with a film of molybdic acid in an amount of 0.1 to 10% by weight in terms of Mo based on aluminium, which is further coated with a phosphoric film in an amount of 0.05 to 1% by weight in terms of P based on aluminium.

DETAILED DESCRIPTION OF THE INVENTION

The aluminium pigment according to the present invention is prepared by first treating the aluminium flakes with an alkaline aqueous solution containing ammonium molybdate, whereby a film of molybdic acid in an amount of 0.1 to 10% by weight in terms of Mo based on aluminium is formed on the aluminium flakes and by further treating the aluminium flakes so-coated with a film of molybdic acid with a solution containing a phosphoric acid compound, whereby a phosphoric film in an amount of 0.05 to 1% by weight in terms of P based on aluminium is formed on the coated aluminium flakes.

As the aluminium flakes to be treated, aluminium flakes having excellent color tone, that is, aluminium flakes which are rich in metallic luster which have an average particle diameter ($D_{50}$) of about 1 to 50 μm, preferably about 10 to 30 μm can be used. These aluminium flakes are produced by grinding or milling using a grinding agent in the presence of a grinding medium in a suitable device such as a ball mill or an attritor mill. As the grinding agent, higher fatty acids such as oleic acid, stearic acid, isostearic acid, lauric acid, palmitic acid and myristic acid; aliphatic amines; aliphatic amides; or aliphatic alcohols are generally used. As the grinding medium, a mineral oil having a high flash point such as mineral spirit and solvent naphtha is generally used.

Desirably, the aluminium flakes to be treated are first dispersed in a water-soluble solvent mentioned below so that they are easily wet with the alkaline aqueous solution containing ammonium molybdate as a treating solution. If the grinding mediumils incompatible with the treating solution, the grinding medium should be replaced with a water-soluble solvent prior to the first treatment with ammonium molybdate.

Usable ammonium molybdate is either ortho-, meta- or para-molybdate. Alkali or alkaline earth metal molybdate which is also water-soluble is not preferred for treatment of aluminium flakes, because of its high alkaline strength. Further, if the alkali or alkaline earth metal remains in the film, the remaining alkali or alkaline earth metal may affect the coating properties. In the preparation of the treating solution, ammonium molybdate is preferably dissolved in a mixture of water and water-soluble solvent at a concentration of a few % or less. The water-soluble solvent is essential for effecting the contact of the aluminum flakes and ammonium molybdate.

Usable water-soluble solvents include ethylene glycol monobutyl ether (butyl cellosolve), diethylene glycol monobutyl ether, propylene glycol monomethyl ether, propylene glycol monopropyl ether and isopropyl alcohol.

When the aluminium flakes are contacted with the treating solution, the treating solution should be alkaline. In general, the pH of the treating solution is 7 to 10, preferably 7.5 to 9.5 and more preferably 8 to 9. When the pH is less than 7, the reaction of aluminium with ammonium molybdate proceeds very slowly, perhaps due to the presence of grinding agent such as fatty acid adsorbed on the surfaces of the aluminium flakes. Of course, when the treating solution has an acidic pH which is out of the passivation zone, dissolution of aluminum occurs. On the other hand, when the pH of the treating solution is above 10, rapid reaction occurs and as a result, the aluminum pigment excellent in the color tone cannot be obtained.

The first treatment with ammonium molybdate is completed by removing the water and unreacted reactants from the reaction system. After the first treatment has been completed, the reaction product is washed and filtered.

The resultant film of molybdic acid is in the range of 0.1 to 10% by weight, preferably 0.1 to 3% by weight, in terms of Mo based on aluminium. When it is less than the lower limit, the inhibition of the hydrogen gas production is insufficient. On the other hand, when it is above the upper limit, the film is too thick and the color tone is impaired.

After the first treatment, the aluminium flakes are subjected to the second treatment with the phosphoric acid compound so as to form a phosphoric film on the first-treated aluminum flakes. The second treatment comprises treating the aluminum flakes, which have the film of molybdic acid formed by the first treatment with ammonium molybdate, with a solution containing the phosphoric acid compound. When the first-treated aluminium pigment contains water, the water is desirably replaced with the water-soluble solvent prior to the second treatment.

The phosphoric acid compound used as the second treating agent includes inorganic or organic compounds and their salts. The phosphoric acid compounds known as agents for improving the corrosion resistance of aluminium pigments are usable, but their alkali or alkaline earth metal salts are not preferable for the treatment of the aluminium flakes, because of their high alkaline strength. Further, if the alkali or alkaline earth metal remains in the film, the remaining alkali or alkaline earth metal may affect the coating properties.

As the inorganic phosphoric acid, ortho-, pyro- and polyphosphoric acids are exemplified. As the inorganic phosphate salt, ammonium hydrogenphosphate, ammonium dihydrogenphosphate and basic manganous phosphate are exemplified.

As the organic phosphoric acid compounds, organic acid phosphate esters containing one phosphate group, such as methyl acid phosphate, ethyl acid phosphate, isopropyl acid phosphate, butyl acid phosphate, hexyl acid phosphate, oleyl acid phosphate, lauryl acid phosphate, stearyl acid phosphate, octyl acid phosphate, cyclohexyl acid phosphate, phenyl acid phosphate, nonyl phenyl acid phosphate and triphenyl phosphite are exemplified. The acid group in the organic phosphoric acid ester plays an important role when the ester is adsorbed on the surface of the film of molybdic acid.

Because of the presence of acid group, a salt of the organic phosphoric acid ester can be adsorbed on the film of molybdic acid, like the organic phosphoric acid ester. However, the use of a salt of an organic phosphoric acid ester having many acid groups is not preferable, because the phosphate groups remain under unadsorbed condition near the resultant phosphoric film. Also, the use of a neutral salt of the organic phosphoric acid ester is not preferable, because the neutral salt has no active site since the acid groups are completely neutralized and therefore it is hardly adsorbed on the film of molybdic acid. The particularly preferred salt of the organic phosphoric acid ester is an acid salt of the organic phosphoric acid ester, which controls the production of the unadsorbed phosphate groups and allows the adsorption of the salt on the film of molybdic acid due to the presence of the acid groups. It is presumed that the unadsorbed phosphate group near the phosphoric film resulting from the use of the acid salt of the organic phosphoric acid ester is small. Usable bases which form the acid salt of the organic phosphoric acid ester include organic amines. Preferably primary or secondary amines having a total carbon number of 3 to 36 are used such as butyl amine, dibutyl amine, hexyl amine, dihexyl amine, octyl amine, dioctyl amine, decyl amine, didecyl amine, lauryl amine, dilauryl amine, myristyl amine, dimyristyl amine, oleyl amine and stearyl amine, because the use of the salt of the organic acid phosphate ester with the fatty amine can show remarkable improvement in coating properties, especially resistance to hot water, as demonstrated in the following example. Although the reason the coating properties are remarkably improved by the use of the above salt is not clearly understood at present, perhaps it is due to unadsorbed phosphate groups which are present near the phosphoric film and can be reacted with the fatty amine, thereby the phosphate groups are neutralized and deactivated. It is expected that the improvement in coating properties can be obtained by the post-addition of a suitable amount of the fatty amine after the organic phosphoric acid ester is adsorbed on the film of molybdic acid. A highly basic amine including tertiary amine is not preferred, because it makes the paint unstable.

The method for treating the first-treated aluminium flakes with the second treating agent depends on the nature of the second treating agent. When the second treating agent is a phosphoric acid compound insoluble in the organic solvent and soluble in water such as the phosphate salt, the first-treated aluminium flakes are treated with an aqueous solution containing the second treating agent. The thus-treated aluminium flakes are desirably separated from the aqueous solution and washed with an organic solvent miscible with water. By washing with the organic solvent miscible with water, the water-soluble phosphoric acid compound can be uniformly and firmly deposited and fixed on the surfaces of the aluminium flakes and free phosphate ions, which cause a lowering of the resistance of the coating to hot water, can be removed. When the second treating agent is a phosphoric acid compound soluble in organic solvent such as orthophosphoric acid and butyl acid phosphate, the first-treated aluminium flakes are treated with the solution containing the second treating agent in an organic solvent such as isopropyl alcohol or toluene. Desirably, the organic solution is added to the first-treated aluminium flakes and then kneaded.

The resultant phosphoric film is in the range of 0.05 to 1% by weight, preferably 0.1 to 0.5% by weight, in terms of P based on aluminium. When less than the lower limit, the inhibition of hydrogen gas production is insufficient. On the other hand, when it is above the upper limit, the resultant coating is inferior in its resistance to hot water and adhesion.

Generally, the aluminim pigment of the present invention contains a water-soluble solvent having a high boiling point as a volatile component. Usable water-soluble solvents having a high boiling point includes propylene glycols and ethylene glycols, such as propylene glycol monomethyl ether, triethylene glycol monoethyl ether, propylene glycol monoethyl ether, propylene glycol monopropyl ether, dipropylene glycol monomethyl ether, dipropylene glycol monoethyl ether and ethylene glycol monobutyl ether.

The aluminium pigment of the present invention can be incorporated into any water based paint. The type of water based resin constituting the water based paint is either a water soluble resin, a water dispersible resin or an emulsifiable resin. The nature of the water based resin includes a combination of acrylic and melamine resins, a combination of polyester and melamine resins, urethane resin and CAB resin. The type and nature of the water based resin to which the aluminium pigment of the present invention is added is not limited. Of course, the water based paint in which the aluminium pigment of the present invention is incorporated can be coated by any coating method. The known coating methods such as spray coating, airless spray coating and roller coating can be used.

According to the present invention, by treating the aluminium flakes with the alkaline aqueous solution containing ammonium molybdate in the first treatment, the oily grease of the grinding agent (generally the fatty acid such as oleic acid and stearic acid) adsorbed on the surfaces of the aluminium flakes can be cleaned away so that the aluminium flakes are exposed substantially without any organic film. As the result, very thin and relatively actives film of molybdic acid are formed on the exposed surfaces of the aluminium flakes. Further, because the surfaces of the first-treated aluminium flakes are not contaminated with the oily grease of the grinding agent, the phosphoric compound as the second treating agent effectively acts on the first-treated aluminium flakes.

According to the present invention, by the first treatment, the aluminium flakes have the film of molybdic acid on the surfaces thereof, on which the phosphoric film is deposited during the second treatment. Owing to the combination of the film of molybdic acid and the phosphoric film, the aluminium pigment of the present invention shows an excellent advantage with-respect to the inhibition of the hydrogen gas production by the reaction of the aluminium pigment with water.

When the aluminium flakes are treated with a phosphoric acid compound in an amount sufficient to improve the corrosion resistance, the coating properties, that is the resistance of the coating to hot water and the adhesion of the coating, are deteriorated. According to the present invention, the above problems are resolved by considerably lowering the amount of the phosphoric acid compound used due to the formation of the film of molybdic acid on the surfaces of the aluminium flakes by the first treatment. Therefore the corrosion resistance of the aluminium pigment is improved without deteriorating the coating properties. Thus, the aluminium pigment of the present invention is suitable for incorporating in the water based paint used for finish coating car bodies. The aluminium pigment of the present invention can be incorporated in oil paints without inconvenience.

The aluminium pigment of the present invention which is mainly coated with molybdic acid can be used with no environmental problem.

EXAMPLES

The following examples will more fully illustrate the present invention.

EXAMPLES 1 to 3

Aluminium flake (Alpaste® 7675NS, $D_{50}$=14 µm, produced by Toyo Aluminium K.K.), 200 g in terms of Al, was placed in a beaker (3 liters), to which 1 l of propylene glycol monomethyl ether was added followed by stirring at 400 r.p.m., thereby a dispersion of aluminium flakes was prepared. The whole was cooled to 18° C. Independently, 5.0 g of ammonium paramolybdate was dissolved in 200 ml of deionized water, thereby the treating solution was prepared. To the dispersion of aluminium flakes, the treating solution was added dropwise and they were reacted for 1 hour at pH of 8.5 at a liquid temperature of 15 to 20° C. while stirring at 400 to 450 r.p.m. A reaction products was decanted with deionized water three times so as to remove $NH_4$ ions and unreacted ammonium paramolybdate and filtered through a glass filter with suction. The aluminium flakes on the filter were washed with propylene glycol monomethyl ether three times so as to completely remove the water and finally filtered with suction, thereby a first-treated aluminium flake was obtained.

While filtering the first-treated aluminium flakes on the filter with suction, 400 ml of the aqueous solution containing diammonium hydrogenphosphate at the concentration shown in the following Tables was added uniformly to the whole of the first-treated aluminium flakes. The time for contacting the aqueous solution containing diammonium hydrogenphosphate with the first-treated aluminium flakes was controlled using the pressure on the filtration with suction. The concentration of diammonium hydrogenphosphate in the aqueous phosphate solution as the second treating agent and the time for contacting of the aqueous phosphate solution with the first-treated aluminium flakes is shown in Table 1.

After completely filtering with suction, butylcellosolve was added in three portions (1 l per portion) to the whole of the second-treated aluminium flakes on the filter so as to wash the second-treated aluminium flakes. Then, the amount of non-volatile matter was controlled with butylcellosolve in a mixer followed by aging at 50° C. for 2 days so as to obtain the aluminium pigment of the present invention.

The resultant aluminium pigment was subjected to quantitative determination in accordance with ICP emission spectrophotometry to determine the Mo amount and the P amount contained, after drying at 250° C. for 1 hour. The results are shown in Table 1.

EXAMPLES 4 to 6

To the aluminium flakes subjected to the first treatment in the procedure described in the above examples, butyl acid phosphate (JP-504, an equimolar mixture of mono- and di-esters, produced by JOHOKU CHEMICAL CO., LTD.) dissolved in butylcellosolve was added in a mixer and kneaded for 30 minutes for the second treatment. The added amount of the phosphate ester as the second treating agent is shown in Table 2.

The resultant aluminium pigment was subjected to quantitative determination in accordance with ICP emission spectrophotometry to determine the Mo amount, after drying at 250° C. for 1 hour. The results are shown in Table 2. The P amounts shown in Table 2 are calculated values.

EXAMPLE 7

The procedure described in Examples 4 to 6 was repeated, except that the acid salt comprising butyl acid phosphate and lauryl amine (FARMIN® 20D, produced by Kao Corporation) in equal amounts by weight was used in place of the butyl acid phosphate.

Comparative Examples 1 to 6

In Comparative Example 1, the aluminium flakes (Alpaste® 7675NS) as the starting material in the above examples were used after replacing water with isopropyl alcohol in order to be easily dispersed in the water based paint.

In Comparative Example 2, the aluminium flakes (Alpaste® 7675NS) as the starting material in the above examples were subjected to only the first treatment described in Example 1.

In Comparative Example 3, the aluminium flakes (Alpaste® 7675NS) as the starting material in the above examples were used without the first treatment for the following treatment. That is, to the aluminium flakes, 1.5 parts by weight per 100 parts by weight of the aluminium pigment of butyl acid phosphate (JP- 504, produced by JOHOKU CHEMICAL CO., LTD.) dissolved in butylcellosolve were added and kneaded for 30 minutes in accordance with the procedure described in Example 4 after replacing water with isopropyl alcohol.

In Comparative Example 4, the aluminium flakes (Alpaste® 7675NS) as the starting material in the above examples were treated in according with the procedure described in Example 5, except that the first treatment was omitted and oleyl acid phosphate was used in place of butyl acid phosphate.

In Comparative Example 5, the aluminium flakes (Alpaste® 7675NS) as the starting material in the above examples were treated in according with the procedure described in Example 6, except that the first treatment was omitted and oleyl acid phosphate was used in place of butyl acid phosphate.

In Comparative Example 6, a commercially available aqueous aluminium paste (Alpaste® WXM7675) was used.

Test

The stability of the aluminium pigment obtained in each of Examples 1 to 7 and Comparative Examples 1 to 6 in water based metallic paint and the finish coating prepared from the same paint and the top-coat clear paint were tested.

Formulation of water based metallic paint for based coating film:

| | |
|---|---|
| water-soluble acrylic resin neutralized with triethylamine (ALMATEX® WA 911, produced by MITSUI TOATSU CHEMICALS, INC.) | 56.32 g |
| melamine resin (Cymel® 350, produced by MITSUI CYANAMID) | 8.80 g |
| aluminium pigment (as Al) | 6.00 g |
| deionized water | 80.00 g |

The above components were fully stirred and dispersed by hand followed by stirring with a disperser at 1000 rpm for about 10 minutes. Then, its pH was adjusted with 10% triethylamine to 8.6. Its viscosity was adjusted with deionized water to 19 to 20 seconds using #4 Ford cup.

Formulation of oily clear paint for top coating film:

| | |
|---|---|
| acrylic resin (ACRYDIC® A-345, produced by DAINIPPON INK AND CHEMICALS INC.) | 130 g |
| melamine resin (SUPER BECKAMINE® L-117-60, produced by DAINIPPON INK AND CHEMICALS INC.) | 50 g |
| Solvesso® 100 | 70 g |

The above components were dispersed by hand. Its viscosity was 20 seconds using #4 Ford cup.

Coating method:

A steel plate previously electrodeposited with a primer was coated with the above paints using a SA-71 spray gun (IWATA TOSOKI KOGYO K.K.) and an automatic air coating device Model 310741 (SPRAYMATION INC.). Firstly, the steel plate was coated with the water based metallic paint to produce a base coating film that the dried film had 13 μm in thickness by drying in an air oven at 90° C. for 10 minutes. Next, the oily clear coat paint for top coating film was coated so that the dried film had 40 μm in thickness followed by baking to cure in the air oven at 160° C. for 30 minutes.

Stability in the Water Based Paint 80 grams of the water based metallic paint which had not been subjected to the viscosity adjustment was introduced in a flask, which was set in a water bath whose temperature was controlled at 50° C. The cumulative volume of hydrogen gas produced for 10 days was determined. The lower the cumulative volume of hydrogen gas, the higher the stability of the pigment in the paint.

Initial Coating Properties

The changes in color tone of the coating and adhesion of the metallic film with the top clear film after coating were determined.

The color tone (metallic luster IV value) of the coating was determined using a color measurement machine (ALCOPE (trade name) Model LMR-100, KANSAI PAINT CO., Ltd.). The adhesion was determined in accordance with ASTM D3359 B (6 ranks). 4B or more is considered acceptable.

Resistance of Coating in Hot Water

After the test piece was dipped in hot water of 50° C. for 10 days, the adhesion of the metallic film to the top clear film was determined as above.

The change in color tone of the dipped part with respect to the non-dipped part, i.e. the whitening degree was determined with the naked eye. No change in color tone is expressed as "◉". No substantial change in color tone is expressed as "◎". A slight change in color tone is expressed as "○". A border line is expressed as "Δ". A significant change in color tone is expressed as "x"..

The results are shown in Table 3.

TABLE 1

| | Ex. 1 | Ex. 2 | Ex. 3 |
|---|---|---|---|
| first treated aluminium flakes | 100 pbw | 100 pbw | 100 pbw |

TABLE 1-continued

|  | Ex. 1 | Ex. 2 | Ex. 3 |
|---|---|---|---|
| (NV75%) | | | |
| concentration of aqueous phosphate soln | 1 g/l | 10 g/l | 50 g/l |
| contact period | 2 min | 10 min | 25 min |
| Mo content (wt %) | 0.658 | 0.659 | 0.650 |
| P content (wt %) | 0.064 | 0.223 | 0.784 |
| Al content (%) | 55.0 | 55.0 | 55.0 |
| aging condition | 50° C. × 2 days | 50° C. × 2 days | 50° C. × 2 days |
| Aluminium pigment | 10.90 | 10.90 | 10.90 |
| (as Al) | (6.0) | (6.0) | (6.0) |
| varnish A *1) | 56.32 | 56.32 | 56.32 |
| triethylamine | 2.11 | 2.11 | 2.11 |
| varnish B *2) | 8.8 | 8.8 | 8.8 |
| deionized water | 80.0 | 80.0 | 80.0 |
| pH (after adjustment) | 8.6 | 8.6 | 8.6 |
| viscosity (sec) | 19.4 | 19.5 | 19.8 | varnish A *1) water-soluble acrylic resin
varnish B *2) melamine resin
pbw = part(s) by weight

TABLE 2

|  | Ex. 4 | Ex. 5 | Ex. 6 | Ex. 7 |
|---|---|---|---|---|
| first treated aluminium flakes (NV75%) | 100 pbw | 100 pbw | 100 pbw | 100 pbw |
| phosphate ester | 0.3 pbw | 1.5 pbw | 5.0 pbw | — |
| its acid salt | — | — | — | 2.25 pbw |
| Mo content (wt %) | 0.655 | 0.649 | 0.650 | 0.656 |
| P content (wt %) | 0.051 | 0.255 | 0.850 | 0.248 |
| Al content (%) | 55.0 | 55.0 | 55.0 | 55.0 |
| aging condition | 50° C. × 2 days | 50° C. × 2 days | 50° C. × 2 days | 50° C. × 2 days |
| Aluminium pigment | 10.90 | 10.90 | 10.90 | 10.90 |
| (as Al) | (6.0) | (6.0) | (6.0) | (6.0) |
| varnish A *1) | 56.32 | 56.32 | 56.32 | 56.32 |
| triethylamine | 2.11 | 2.11 | 2.11 | 2.11 |
| varnish B *2) | 8.8 | 8.8 | 8.8 | 8.8 |
| deionized water | 80.0 | 80.0 | 80.0 | 80.0 |
| pH (after adjustment) | 8.6 | 8.6 | 8.6 | 8.6 |
| viscosity (sec) | 19.4 | 19.5 | 19.8 | 19.5 | varnish A *1) water-soluble acrylic resin
varnish B *2) melamine resin
pbw = part(s) by weight

TABLE 3

|  | gas volume | coating properties | | | |
|---|---|---|---|---|---|
|  |  | initial | | after dipping in hot water | |
|  | (ml/1 gAl) | IV value | adhesion | whitening | adhesion |
| Ex. 1 | 2.11 | 205 | 5B | ◉ | 5B |
| Ex. 2 | 0.0 | 215 | 5B | ◉ | 5B |
| Ex. 3 | 0.0 | 198 | 5B | △ | 3B |
| Ex. 4 | 1.9 | 212 | 5B | ◉ | 5B |
| Ex. 5 | 0.0 | 218 | 5B | ◉ | 5B |
| Ex. 6 | 0.0 | 194 | 4B | △ | 3B |
| Ex. 7 | 0.0 | 214 | 5B | ◉ | 5B |
| Comp. Ex. 1 | >20.0 | 241 | 5B | ◉ | 5B |
| Comp. Ex. 2 | 6.4 | 228 | 5B | ◉ | 3B |
| Comp. Ex. 3 | 12.0 | 203 | 4B | X | 2B |
| Comp. Ex. 4 | 7.4 | 219 | 4B | X | 2B |
| Comp. Ex. 5 | 2.3 | 203 | 3B | X | 2B |

TABLE 3-continued

| | | coating properties | | | |
|---|---|---|---|---|---|
| | gas volume | initial | | after dipping in hot water | |
| | (ml/1 gAl) | IV value | adhesion | whitening | adhesion |
| Comp. Ex. 6 | 2.76 | 237 | 5B | X | 3B |

What is claimed is:

1. An aluminium pigment comprising aluminium flakes, the surface of each aluminium flake being coated with a film of molybdic acid in an amount of 0.1 to 10% by weight in terms of Mo based on aluminium, which is further coated with a phosphoric film derived from a phosphoric compound selected from the group consisting of inorganic phosphoric acids, organic phosphoric acid esters having one phosphate group and their salts in an amount of 0.05 to 1% by weight in terms of P based on aluminium.

2. An aluminium pigment as claimed in claim 1, wherein the salt of the organic phosphoric acid ester consists of the organic phosphoric acid ester and a fatty primary or secondary amine.

3. An aluminium pigment as claimed in claim 2, wherein the fatty primary or secondary amine contains 3 to 36 carbon atoms in total.

4. An aluminium pigment as claimed in claim 2, wherein the phosphate group of the organic phosphoric acid is adsorbed on the film of molybdic acid or reacted with the fatty primary or secondary amine.

5. A water base metallic paint or ink comprising the aluminium pigment of claim 1.

6. A metallic coating film comprising the aluminium pigment of claim 1.

* * * * *